Sept. 22, 1953        F. W. A. KURZ        2,652,660
METHOD OF PRODUCING LAMINATED SHEETS OF GLASS
Filed Feb. 20, 1951        2 Sheets—Sheet 1

INVENTOR
FREDRICK WILHELM ANTON KURZ
BY
ATTORNEY

Sept. 22, 1953 F. W. A. KURZ 2,652,660
METHOD OF PRODUCING LAMINATED SHEETS OF GLASS
Filed Feb. 20, 1951 2 Sheets-Sheet 2
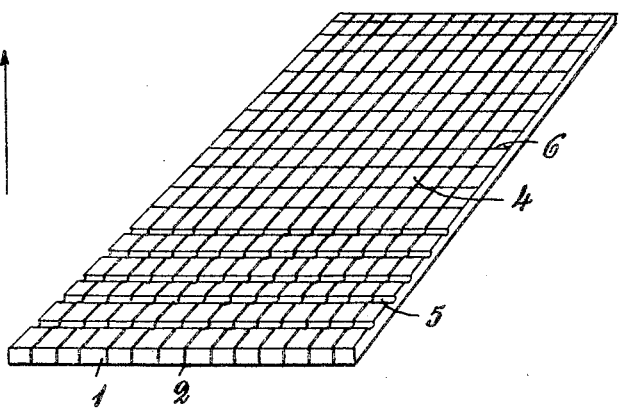
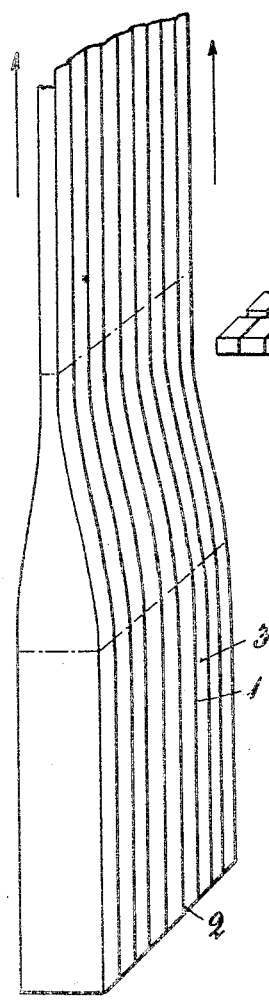
INVENTOR
FREDRICK WILHELM ANTON KURZ
BY
ATTORNEY Patented Sept. 22, 1953

2,652,660

UNITED STATES PATENT OFFICE 2,652,660

METHOD OF PRODUCING LAMINATED SHEETS OF GLASS

Fredrik Wilhelm Anton Kurz, Nybro, Sweden

Application February 20, 1951, Serial No. 211,930
In Sweden February 22, 1950

7 Claims. (Cl. 49—79)

The present invention relates to a method of producing laminated sheets of glass. Such laminated sheets are particularly suitable for shading light for example emanating from fluorescent tubes, but may also be employed for numerous other purposes such as to subdue or distribute light or to prevent glare.

According to the invention, the new method resides in first forming a preliminary sheet of glass having a greater thickness than is desired for the finished sheet and composed of a plurality of elongated glass strips disposed side to side at an angle to the face planes of the preliminary sheet and fused together with substantially the entire areas of their abutting sides, heating the preliminary sheet until sufficiently softened for drawing, and drawing the preliminery sheet in the longitudinal direction of the strips until the sheet is reduced to the thickness desired for the finished sheet.

In this manner laminated sheets of glass of considerable length and width can be produced, using as starting material relatively wide and short strips of glass which considerably facilitates the assembly and fusing of the strips.

According to the invention, the strips may be cut and assembled in a cold state, but it is also possible to employ as starting material liquid glass, which can be extruded or drawn from nozzles in the form of strips or layers, these nozzles being disposed side by side. If strips are used thick and clear strips of glass may be combined with strips composed of thinner and colored glass, in which case both kinds of glass should have the same expansion coefficient, or strips of two-layer glass may be employed for example so-called flashed glass, in which a thin covering layer is fused to a heavier base of clear glass.

If it is desired that the laminations in the finished laminated sheet of glass are slanted, for example at an angle of 45° to the surface of the sheet, the strips assuming that pre-cut strips are used, are assembled at the desired angle and then fused together. If layers formed from liquid glass extruded or drawn from nozzles are employed, the nozzles are arranged at the desired inclination.

Although the surfaces of the sheets acquire a smooth surface by the drawing operation and the heat, the glass sheets can be subjected during the drawing or a subsequent operation to a rolling operation, for example between two rollers, which may be patterned to impart to one or both sides of the sheet an ornamental or functional design.

Although it is frequently preferable to produce the laminated glass from alternating clear and colored strips or layers of glass, the invention is in no way limited thereto.

If desired, merely differently colored strips or layers of glass may be employed, and in this case, and also when clear and colored strips are used, the thickness of the strips may be equal or may vary.

A very interesting effect can be obtained with black laminations, which open up completely new possibilities for shop window illumination. If the light source is disposed below a horizontally disposed laminated sheet on which the goods to be displayed are placed. The rays of light will pass directly on to the articles, while an observer will see merely the black laminations, but not the light source.

When the black laminations are disposed at an angle of 45°, they form a Venetian blind, i. e. it is possible to see between the same from one side while the view from the opposite side is obstructed. In this manner windows for motor cars shielded against the glare of the sun and also numerous other possibilities are obtainable.

To impede the view also at an oblique angle in the direction parallel to the laminations, one side of the laminated sheet, either during the drawing operation or subsequently thereto, may be furnished with closely disposed parallel, for example prismatic grooves, which are situated at an angle, preferably at right angles, to the laminations. These grooves may also be colored or enamelled, or be filled with paint or enamel, for example of the same color as the laminations, so that the sheets are furnished with a checkered design. The paint or the enamel may be baked on either simultaneously or subsequently. If desired, colored parallel edge strips of this nature may be provided on the flat ungrooved sheets.

Generally, laminated glass is produced by using two different layers or strips of glass only but, of course, the method according to the invention is applicable also to the production of laminated glass composed of more than two different layers of glass. A laminated sheet of glass produced according to the invention may be subjected to any desired subsequent treatment, for example it may be bent into a channel-like shape, dish shape and the like.

In the accompanying drawing several exemplifications of the invention are shown illustrating the manner in which the method of the invention may be carried out.

In the drawing:

Fig. 3 is a view of the sheet of Fig. 1 but partly drawn, and

Fig. 4 is an isometric view of a finished laminated sheet of glass formed with a surface pattern.

Figure 1:
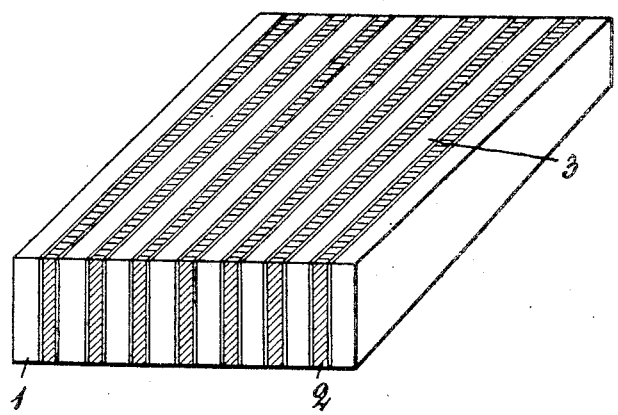
Fig. 1 is an isometric view of a laminated sheet of glass prior to the drawing operation, the strips of glass being disposed at a right angle to the plane of the sheet.

Referring now to the figures in detail, Fig. 1 shows a laminated sheet composed of strips 1 of clear glass and strips 2 of colored glass. The strips are fused together so that the long edges of the strips form the surfaces of the sheet of glass. As will be noted, the sheet of glass thus obtained is comparatively short and thick.

Figure 2:
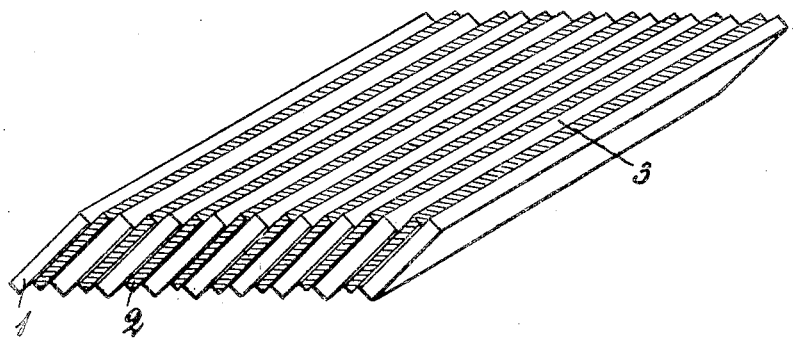
Fig. 2 is a view similar to Fig. 1 but showing the strips disposed at an angle.

Sheet 3 according to Fig. 2 is also composed of clear and colored strips 1 and 2 respectively. In contrast to Fig. 1, the strips are disposed at an acute angle to the plane of the glass sheet.

Fig. 3 illustrates how the thickness of the original sheet 3 is reduced by drawing the sheet in the longitudinal direction of the strips. The arrows indicate the direction of the drawing operation. For the purpose of drawing, the sheet may be disposed horizontally, vertically or in any other position. The drawing operation is basically the same as is employed for the drawing of conventional window panes. The same steps are taken to maintain an even width and thickness of the sheet and to secure the proper cooling of the finished sheet. Accordingly, it is believed that a detailed description of the cooling operation is not essential for the understanding of the invention.

The finished laminated sheet 4 according to Fig. 4 is surface patterned by means of transverse grooves and further ornamented by the insertion of colored strips 6 which are disposed at a right angle to the longitudinal direction of strips 1 and 2.

The strips of glass may be fused together for instance at a temperature between 750° and 900° C. depending upon the composition of the glass. The laminated and fused sheet of glass may be drawn at a temperature between 800° and 950° C.

What is claimed is:

1. A method of producing a laminated sheet of glass comprising the steps of first forming a preliminary sheet of glass having a greater thickness than is desired for the finished sheet and composed of a plurality of elongated glass strips disposed side to side at an angle to the face planes of the preliminary sheet and fused together with substantially the entire areas of their abutting sides, heating the preliminary sheet until sufficiently softened for drawing, and drawing the preliminary sheet in the longitudinal direction of the strips until the sheet is reduced to the thickness desired for the finished sheet.

2. A method of producing a laminated sheet of glass comprising the steps of first forming a preliminary sheet of glass having a greater thickness than is desired for the finished sheet and composed of a plurality of elongated strips with substantially the same coefficient of temperature and melting point disposed side to side at an angle to the face planes of the preliminary sheet and fused together with substantially the entire areas of their abutting sides, the said plurality of strips including a number of strips different from the other strips of the said plurality as to selected physical properties, heating the preliminary sheet until sufficient softened for drawing, and drawing the preliminary sheet in the longitudinal direction of the strips until the sheet is reduced to the thickness desired for the finished sheet.

3. A method as defined in claim 2, wherein the said different strips are different as to coloring from the other strips of said plurality of strips.

4. A method as defined in claim 1, wherein the said different strips are different as to thickness from the other strips of said plurality of strips.

5. A method of producing a laminated sheet of glass comprising the steps of assembling in side to side positions a plurality of elongated glass strips having substantially the same coefficient of temperature and melting point and a greater width than the desired thickness of the sheet to be produced, the juxtaposed edges of said assembled strips forming a preliminary sheet of a greater thickness than is desired for the finished sheet and in which the strips are disposed at an angle to the sides of the preliminary sheet, subjecting the assembled strips to a first heating in which the said assembled strips are fused together with substantially the entire areas of their abutting sides, subjecting the preliminary sheet to a second heating so that the strips are softened for drawing of the preliminary sheet, and finally drawing the preliminary sheet in the longitudinal direction of the strips until the width of the strips corresponds to the desired thickness of the sheet to be produced.

6. A method as defined in claim 5, wherein the said plurality of strips includes a number of strips different from the other strips of the said plurality of strips as to selected physical properties.

7. A method as defined in claim 6, wherein strips of different coloring alternate in the said plurality of assembled strips.

FREDRIK WILHELM ANTON KURZ.

References Cited in the file of this patent

UNITED STATES PATENTS

| Number | Name | Date |
| --- | --- | --- |
| Re. 21,313 | Desagnat | Jan. 2, 1940 |
| 631,220 | Manning | Aug. 15, 1899 |
| 1,734,965 | Danner | Nov. 12, 1929 |
| 2,122,246 | Clewell | June 28, 1938 |
| 2,183,961 | Fischer | Dec. 19, 1939 |
| 2,193,207 | Rosen | Mar. 12, 1940 |

FOREIGN PATENTS

| Number | Country | Date |
| --- | --- | --- |
| 223,379 | Germany | Oct. 27, 1908 |
| 384,097 | France | Mar. 28, 1908 |